July 14, 1964  P. LABASH, JR  3,141,052
METHOD OF FORMING SEAMLESS HOLLOW PLASTIC SHAPES
Filed Sept. 19, 1960
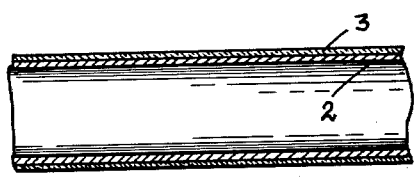
Fig.1.
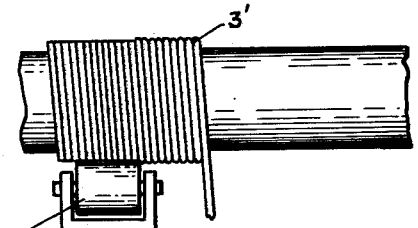
Fig.2.
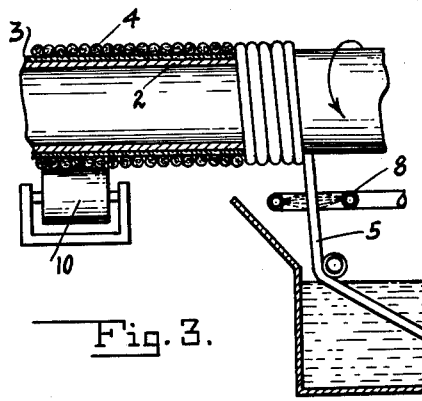
Fig.3.
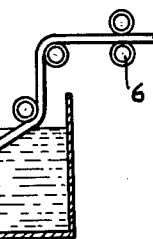
Fig.6. Fig.7.
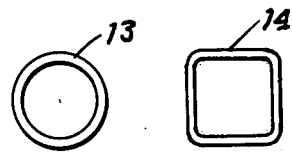
Fig.8. Fig.9.
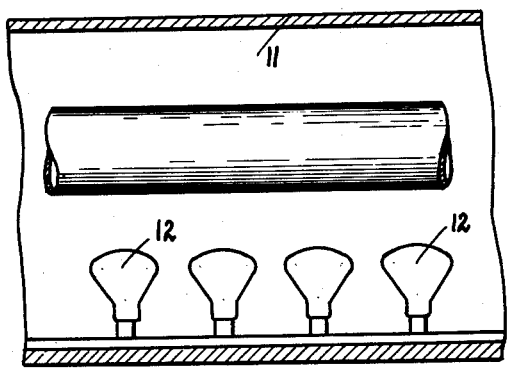
Fig.5.
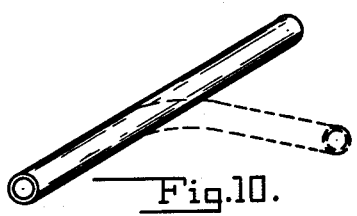
Fig.10.
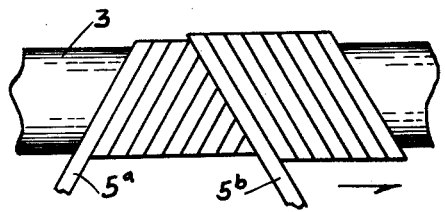
Fig.4.
INVENTOR.
PETER LABASH, JR.
BY
Christy, Parmelee & Strickland
ATTORNEYS.

United States Patent Office 3,141,052
Patented July 14, 1964

3,141,052
METHOD OF FORMING SEAMLESS HOLLOW
PLASTIC SHAPES
Peter Labash, Jr., 300 E. Warrington Ave.,
Pittsburgh 10, Pa.
Filed Sept. 19, 1960, Ser. No. 56,771
2 Claims. (Cl. 264—219)

This invention relates to the molding of plastic articles and more particularly to the process of molding elongated fiber-reinforced seamless plastic articles, particularly hollow vessels, especially deep vessels of either cylindrical or polygonal shape, tubing, or pipes and other forms and shapes.

An important limitation to the forming of fiber-reinforced shapes from resinous compounds, especially thermosetting resins, is due to the fact that in the use of such fibers, the fiber must be saturated with the resin in liquid form and fibers and liquid must be supported on a form until the resin has at least partially cured. As the resin cures, it contracts toward the center of the form, so that the formed article cannot be stripped from the support. This may be true, even if the core is made with a taper or "draft," and even though the form is polished with a so-called releasing compound.

According to the present invention, an elongated rigid core or mandrel of the required shape and size has a continuous wrapping of string or cord applied thereto which is coated either before or after application to the core with wax. After the composite core has been formed, a resin-impregnated layer or layers of fiberglass reinforcing are applied over and around the core to the required external shape. The resin is then cured, preferably initially without external heat, followed by heating. The resin will not adhere to the wax-coated wrapping, and as the resin shrinks upon curing and under heat, the wax will soften and the string will yield to relieve shrinking stresses in the article being formed. After the resin has cured, and with the wax softened by heat, the molded article may be removed from the core, if necessary, by unwrapping the string.

A primary object of my invention is, therefore, to provide a novel process for the molding of seamless hollow shapes and sections from fiber-reinforced plastic.

A further object of my invention is to provide a method of molding an article of resin and fibers upon a support having a normally fibrous surface having normally solid wax thereover that may be melted at a temperature below the temperature where the plastic article will be damaged.

A further object of my invention is to provide a solid method of forming fiber-reinforced seamless tubes and hollow shapes.

These and other objects and advantages are secured by my invention as will be more fully apparent from the following description in conjunction with the accompanying drawings which are schematically illustrative of my invention and the method of practising the same, and in which:

FIG. 1 is a longitudinal section showing schematically a rigid core or mandrel coated with a meltable covering;

FIG. 2 is a longitudinal side elevation showing schematically a modification in which the core is prepared by wrapping it with wax-impregnated cord;

FIG. 3 is a schematic view, partly in section and partly in elevation, showing a simple procedure for practising my method by wrapping the core with resin-impregnated fiberglass roving;

FIG. 4 is a fragmentary schematic view showing a modification in which the coated core is wrapped with resin-impregnated tape, the view being a fragmentary side elevation;

FIG. 5 is a schematic illustration of the step of curing where heat curing is required;

FIGS. 6, 7, 8 and 9 are end views of some typical shapes which the method may produce; and FIG. 10 is a perspective view showing the practice of my invention with a bendable core.

Refering to the drawings, and first to FIG. 1, 2 designates a supporting core of smaller diameter than the interior of the article to be formed, and of the sectional shape of the article to be formed. It is here shown as a hollow cylindrical tube. Over it a layer 3 which is of a desired thickness from 1/32 to 1/4 of an inch or more and which is prepared by wrapping a continuous layer of a fibrous string or cord about the mandrel with said continuous wrapping having a waxed surface as better illustrated in FIG. 2. The wax-coated wrapping should be thick enough to constitute a layer as distinguished from a skin coat or film or polish. It may be applied by dipping, spraying, rollers, or otherwise, and it should be uniform to produce a concentric uniform product, but may be purposely thicker in one area than another if the product to be formed is to have an internal taper or bulge, or one section of larger diameter than another. Also, instead of being smooth, the surface of the wax may be corrugated, or coarse spiral grooves formed therein to produce internal threads on the finished product, or other surface irregularities may be formed on the surface of the wax.

Materials which are used as a coating for the string are paraffin waxes, microcrystalline petroleum wax, or wax blends.

As more clearly shown in FIG. 2, the wax-carrying cord wrapping is applied in contiguous convolutions to form a continuous wrapping indicated as 3'. As before indicated, the string or cord may have been coated with wax before it is applied to the mandrel, or after it has been applied, and after application the wrapping may be smoothed down by rolling it with a roller such as that indicated at 10 in FIG. 2.

After the core has been prepared as above described and according to FIG. 1 or 2, a resin-impregnated layer of fiberglass is formed about the meltable layer. This may be done by rotating the core, as indicated by the arrow in FIG. 3. One or more strands of fiber or roving are drawn under tension through a resin bath and then closely wrapped about the core. In FIG. 3, the core is designated 2, the layer of solidified meltable material is 3, and 4 designates one or more wrappings of fiber-impregnated strands. The fiber strand 5 is drawn through braking or friction rolls 6, then through a bath of liquid resin 7, with or without a promoter. Then the strand or strands, upon emerging from the bath, is sprayed at 8 with catalyst, provided that a promoter is present in the resin, and the strand or strands are wrapped in one or more layers about the core. If there is no promoter in the resin, the catalyst is preferably present in the bath.

In the manufacture of long tubular products, the core may progress through different stations so that while wax carrying wrapping is being applied at one area, a previously-prepared section or area of the core is being wrapped with resin-impregnated fiber.

Instead of wrapping fiber strands around the core, chopped lengths of fiber and resin may be spray-applied in a manner known in the art. Also, instead of using strands of fibers, one or more layers of tape made from fibers, are wrapped about the core after the tape is impregnated as in FIG. 3, and catalyst applied thereto. FIG. 4 shows that one layer of fibers or tape may be wrapped over another and spiraled in an opposite direction. The tapes are designated 5a and 5b. Combinations of strands and tapes also may be used, and the opposite spiraling or diagonal arrangement of the fibers as illustrated in FIG. 4 may be used in place of the wrapping shown in FIG. 3, and the single layer shown in FIG. 3 may be used with the tape of FIG. 4. Also, a wax-coated string as shown in FIG. 2 may be spiraled over the wax or other meltable coating of FIG. 1 to form an internal thread or other internal configuration on the interior of the finished product.

The fibers may be organic fibers, such as cotton threads or duck, but preferably, for maximum strength and resistance to weathering, fiberglass is used in any of the various forms in which it is available to the plastic industry.

The resin may be selected according to the product to be formed. Preferably the resin is a thermosetting liquid resin that may be cured at room temperature, or under moderate heat without pressure. For most purposes, that resin known commercially as polyester is satisfactory, economical, and easily used. However, I may use other resins, such as glycidyl ether of polyhydric phenol, known and sold commercially as epoxy resin. A commercial epoxy resin having a viscosity at 25° C. of 40 to 160 poises and an epoxide equivalent in the range of 140 to 280 is typical, and diethylene triamine is a widely used catalyst therefor, although this invention is in no way restricted to such materials.

Polyester resin as referred to herein means the commercial material sold as polyester resin, and which technically is an unsaturated polyester dissolved in a polymerizable monomer, as styrene or other monomer. The polyester is the reaction product of a dihydric or polyhydric alcohol and an unsaturated dibasic acid. Benzoyl peroxide and methyl ethyl ketone peroxide are commonly used catalysts or curing agents. For curing at room temperature, the manufacturer of resin usually supplies or incorporates a promoter.

The resins may carry fillers or extenders, as known in the art. Other usable resins of a liquid character before curing may also be used, as for example air-hardening phenol-formaldehyde resins, the materials themselves forming no part of this invention.

As an example, a metal tube has applied thereto a wrapping of perhaps 3/16" thick of cord and wax such as paraffin wax. The metal tube so coated is then closely wrapped with fiberglass roving, applying one or more layers, the rovings having previously been saturated with polyester resin and catalyst. The core may be mounted and rotated in any suitable way to facilitate covering. If desired, the wrapped surface may be smoothed or rolled as indicated at 10 in FIG. 3, and a finish coat of the resin, if desired, may be sprayed over the wrapping, and it is likewise contemplated that the wax or wax-coated string may be smoothed by similar means, as indicated at 10 in FIG. 2. The resin will first gel, and at this time the product takes on sufficient strength to be self-supporting. Heat will be generated in the curing of the resin to a point where the surface wax immediately in contact with the resin will soften or melt and the resin may cure and contract without stresses or surface cracks or checks. Final curing may, if necessary, be effected as indicated in FIG. 5 by exposing the product to heat. In this figure, 11 indicates an enclosure with heat-radiating lamps 12 therein. The melting of the wax at this time will do no harm since the resin will have gelled and adequate support is provided by the core with its wrapping and the melting of the wax will facilitate stripping of the finished product from the core. Wax may be recovered for reuse. Any wax retained on the inside of the finished piece may be removed, if necessary, by gasoline or other solvent, although hot water may remove most of it.

With this method, the wax first provides a support on which the product is formed, allows for the contracting of the resin upon curing, and finally is melted away sufficiently to release the finished piece. This is true whether the fiber is glass or vegetable; whether the fiber and resin are sprayed on, wrapped on, or are in the form of fabric, tape, or rovings, and whether the diameter is uniform or non-uniform. With wax-coated string employed, as in FIG. 2, there is sufficient wax on the string and compressibility in the string itself to allow for the contracting of the resin upon curing; and when the wax is heat-softened, the string may be pulled out or unwrapped from the core before the formed article is stripped away.

In FIG. 6, the finished product 13 is circular. In FIG. 7 a square core was used to develop a square section 14; in FIG. 8 the section 15 is semi-round, and in FIG. 9 the section 16 is triangular. Sections so developed are strong because of the strength imparted by the fiber. They can be used for structural parts, furniture, ducts, pipes for low or high-pressure fluids, or in environments where corrosion resistance or electrical insulation, especially with good mechanical strength, is required.

FIG. 10 shows schematically a modification in which the core is capable of being flexed. It may be plastic tubing, spiral flexible metal tubing, or even wax. If made of other than wax, it has a layer of wax over it, or if not wax, other meltable material. It is covered with a layer of resin-impregnated fibers. In the drawing, 17 designates the composite assembly. Before the resin has taken a set, the assembly is warmed to a point where the wax or coating is bendable but not fluid, and the core is bent in any direction, as indicated by the dotted lines, after which the section is cured.

It will be understood that I have described certain specific embodiments of my invention, but these are merely illustrative of the practice of my invention, and various types of apparatus may be used. My invention, utilizing a core having a fibrous surface carrying of a meltable material on which material the product is formed, and which may subsequently be melted to release the product from the form, enables seamless fiber-reinforced articles to be produced from thermosetting resins which cannot be produced by those procedures applicable to the manufacture of thermoplastic resins without fiber reinforcing, as extrusion, or by blow molding. Moreover, my process enables the articles to be formed by using chopped fibers, roving, tape, or cloth. While paraffin and microcrystalline wax, sometimes referred to generically as petroleum waxes, are specifically mentioned, other waxes are within the contemplation of this invention where they are solid at room temperature but may be softened by heat.

I claim:

1. The method of making an elongated seamless hollow body of fiber-reinforced plastic which comprises covering an elongated rigid core with a wax-impregnated fibrous material to provide a continuous covering over the core, wrapping the covered core with a fibrous wrapping material saturated with a reactive resin and curing agent to a desired thickness and contour, effecting the curing of the resin with the wax in the fibrous covering material softened to enable the resin-impregnated wrapping to shrink as the resin cures but continue to provide a firm support therefor until an initial gel has developed, and thereafter stripping the article from the form by heat-softening the wax-impregnated fibrous material.

2. The method of making an elongated seamless hollow body of fiber-reinforced plastic as defined in claim 1 wherein the wax-impregnated fibrous material covering the form is applied more thickly to the core in some places than others, whereby the contour of the covered form departs from the contour of the rigid core.

References Cited in the file of this patent

UNITED STATES PATENTS

| | | |
|---|---|---|
| 935,254 | Gleason | Sept. 28, 1909 |
| 1,876,229 | Herzog et al. | Sept. 6, 1932 |
| 2,413,731 | Samuel | Jan. 7, 1947 |
| 2,723,705 | Collins | Nov. 15, 1955 |
| 2,786,007 | Chew | Mar. 19, 1957 |
| 2,964,796 | Press | Dec. 20, 1960 |